J. G. PORTER.
STEERING COUPLING FOR AUTOMOBILES.
APPLICATION FILED AUG. 25, 1916.
1,222,666.
Patented Apr. 17, 1917.
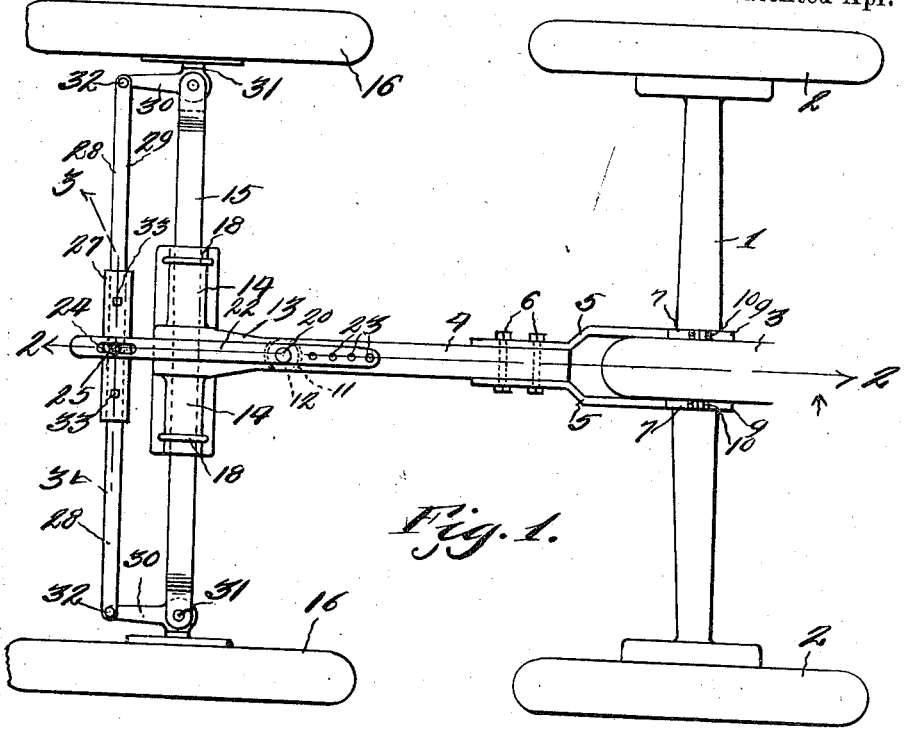
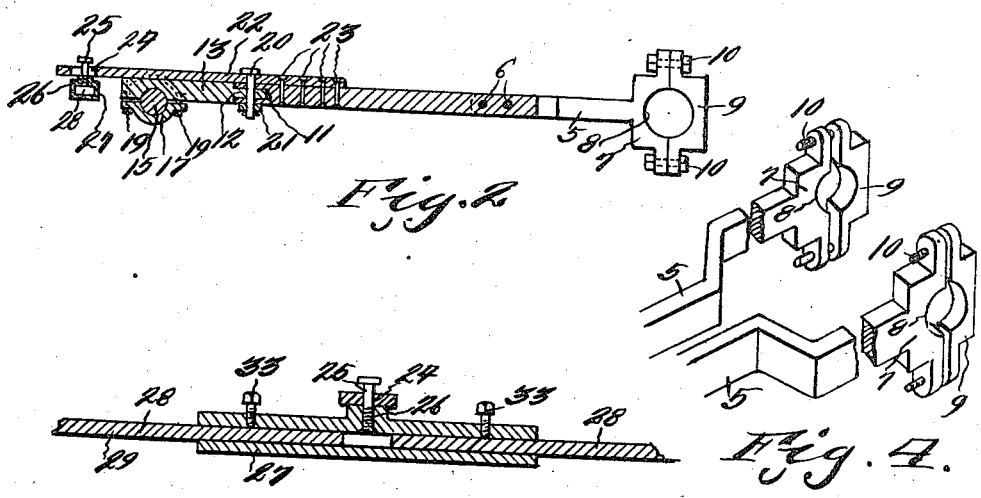
Witnesses
Inventor
J. G. Porter
By D. Swift & Co.
Attorneys

UNITED STATES PATENT OFFICE.

JOHN G. PORTER, OF BRIDGEPORT, NEBRASKA.

STEERING-COUPLING FOR AUTOMOBILES.

1,222,666.

Specification of Letters Patent.

Patented Apr. 17, 1917.

Application filed August 25, 1916. Serial No. 116,857.

*To all whom it may concern:*

Be it known that I, JOHN G. PORTER, a citizen of the United States, residing at Bridgeport, in the county of Morril, State of Nebraska, have invented a new and useful Steering-Coupling for Automobiles; and I do hereby declare the following to be a full, clear, and exact description of the invention, such as will enable others skilled in the art to which it appertains to make and use the same.

This invention relates to an improved steering coupler connecting the rear axle of a front machine and the forward axle of a trailing machine.

When an automobile is disabled, and attached to another automobile for hauling the same to a repair shop, it requires an operator, to steer the same. Therefore, one of the objects of the invention is to provide an improved, simple, efficient and practical device of the foregoing nature, whereby as the forward machine turns to the right or the left the front wheels of a rear machine are correspondingly turned, by means of improved connections between the coupler and the connecting rod of the knuckle joints of the front wheels of the rear machine.

In practical fields the details of construction may necessitate alterations, falling within the scope of what is claimed.

The invention comprises further features and combination of parts, as hereinafter set forth, shown in the drawings and claimed.

In the drawings:

Figure 1 is a plan view showing the rear axle of the forward machine, and the front axle of a rear machine, illustrating the steering coupler connecting the two axles.

Fig. 2 is a sectional view on line 2—2 of Fig. 1.

Fig. 3 is a sectional view on line 3—3 of Fig. 1.

Fig. 4 is an enlarged detail view showing the connections of the coupler to the rear axle of the forward machine.

Referring more especially to the drawings, 1 designates the casing for the rear axle (not shown) of the rear wheels 2 of the forward machine, which casing 1 is provided with a central enlarged casing 3 designed to inclose the transmission gearing (not shown) of the rear axle. The coupler comprises the bar 4, to the forward end of which the plates 5 are bolted as shown at 6. The forward end of each plate 5 is provided with a clamping block having a semi-cylindrical bearing 8, so as to receive one side of the casing 1, that is, when the block 7 is placed in position. Additional clamping blocks 9 (which are reversible) are clamped against the other cylindrical surface of the casing 1, and to the blocks 7 by means of the bolts 10. The plates 5 are arranged upon opposite faces of the casing 3 of the transmission gearing (not shown). As shown in Fig. 2, the rear end of the bar 4 is bifurcated as shown at 11, to receive the tongue 12 of the plate 13, the rear end of which is provided with laterally extending extensions 14, which are arched or semi-circular in cross section, so as to fit and receive the upper portion of the cylindrical axle 15 of the front wheels 16 of the rear machine or automobile. The plate 13 has a semi-circular bearing alined with the semi-circular curvature of the extensions 14, so as to receive the axle 15. A semi-circular plate 17 fits the under cylindrical surface of the axle 15, and is clamped in place and to the extensions 14 by the U-shaped bolts 18, and the nuts 19. It is to be observed that by means of the bar 4 and the plate 13, a front and rear machine may be pivotally united, by means of the bolt 20 (which passes through the bifurcated end of the bar 4 and the ear or lug 12) and the nut 21. The bolt 20, however, also passes through the bar 22, which is bolted by several bolts or rivets 23 to the bar 4. It is to be noted that the bar 22 is fixed to the bar 4 forward of the bolt 20, and has its rear end portion extending beyond the axle 15 and has a slot 24, which receives the pin or lug 25, which is threaded at 26 in the coupling sleeve or casing 27. This coupling casing or sleeve 27 (which is rectangular in cross section) receives the adjacent ends of the two sections 28 of the connecting bar 29, which connects the rearwardly extending arms 30 of the knuckle joints 31 of the front wheels 16 of the rear machine or automobile. The pivotal connection of the arms 30 and the sections 28 are designed by the numeral 32. The sections of the connecting rod or bar 29 are secured in the coupling casing or sleeve 27, by means of the set bolts 33. The connecting bar 29 of the style shown in the drawing is a false or temporary substitute for the usual connecting bar. As before stated, it is to be noted that the bar 22 is connected to the bar 4 forward of the pivot bolt 20, so that when the forward machine or automobile turns to the right or the left, the bar 4 will oscillate or swing upon its pivot 20 with the plate 13, and owing to the slot and pin connections 24 and 25, the connecting bar 29 will be shifted in one direction or the other, thereby turning the front wheels 16 of the rear machine or automobile, so as to guide the rear machine in a direction corresponding to the direction in which the forward or front machine is traveling. It is to be observed that the plates 5 are connected to the casing 1, so as to permit the two machines or automobiles to accommodate themselves to the unevennesses in the road.

The invention having been set forth, what is claimed as new and useful is:—

A steering coupler between a towing automobile and a trailer automobile, comprising a bar having pivotal connections to the rear axle casing of the towing machine so as to pivot vertically, a plate having clamping connections to the front axle of the rear machine and provided with a forward extension ear or lug, the rear end of said bar having a bifurcation to receive said ear or lug, a pivot extending through the bifurcated end of the bar and the ear, a second bar connected to the rear portion of the first bar forward of said pivot and extending rearwardly beyond the front axle of the trailer machine, a false or substitute connecting bar connecting the rear arms of the knuckle joints of the front wheels of the trailer machine consisting of two sections, a sleeve connecting the two sections of the connecting bar, and a slot and pin connection between the sleeve and the rear end of the second bar.

In testimony whereof I have signed my name to this specification in the presence of two subscribing witnesses.

JOHN G. PORTER.

Witnesses:
EMMA L. LYON,
FLORENCE T. CRAM.